United States Patent [19]

Caspari

[11] Patent Number: 5,393,590
[45] Date of Patent: Feb. 28, 1995

[54] HOT STAMPING FOIL

[75] Inventor: Ruediger Caspari, Ratingen, Germany

[73] Assignee: Minnesota Mining and Manufacturing Company, St. Paul, Minn.

[21] Appl. No.: 88,851

[22] Filed: Jul. 7, 1993

[51] Int. Cl.$^6$ ............................................... B32B 3/00
[52] U.S. Cl. ........................ 428/195; 428/202; 428/204; 428/207; 428/425.1; 428/457; 428/480; 428/500; 428/914
[58] Field of Search ............... 428/461, 195, 216, 913, 428/914, 202, 204, 207, 425.1, 457, 480, 500; 427/209, 404; 156/233

[56] References Cited

U.S. PATENT DOCUMENTS

| | | |
|---|---|---|
| 1,882,593 | 10/1932 | Hentschel . |
| 2,556,078 | 6/1951 | Francis, Jr. .......................... 154/95 |
| 3,434,862 | 2/1966 | Luc ........................................ 117/10 |
| 3,666,516 | 5/1972 | Dunning ............................... 117/3.4 |
| 3,708,320 | 10/1973 | Hurst et al. ........................... 117/3.3 |
| 3,770,479 | 11/1973 | Dunning ............................... 117/3.4 |
| 3,834,925 | 9/1974 | Matsumura et al. .................. 117/3.4 |
| 3,853,660 | 12/1974 | Peters et al. ......................... 156/230 |
| 3,912,569 | 10/1975 | Kapral .................................. 156/230 |
| 3,952,131 | 4/1976 | Sideman .............................. 428/334 |
| 3,953,635 | 4/1976 | Dunning ............................... 428/151 |
| 4,007,067 | 2/1977 | Dunning ................................ 156/61 |
| 4,084,032 | 4/1978 | Pasersky .............................. 428/172 |
| 4,087,032 | 4/1978 | Pasersky .............................. 428/172 |
| 4,255,480 | 3/1981 | Scher et al. ......................... 428/208 |
| 4,517,235 | 5/1985 | Ungar et al. ......................... 428/148 |
| 4,548,857 | 10/1985 | Galante ............................... 428/200 |
| 4,555,436 | 11/1985 | Geurtsen et al. ................... 428/200 |
| 4,645,555 | 2/1987 | Kuboyama .......................... 156/234 |
| 4,786,537 | 11/1988 | Sasaki ................................... 428/40 |
| 4,875,961 | 10/1989 | Oike et al. ........................... 156/234 |
| 4,892,602 | 1/1990 | Oike et al. ........................... 156/233 |
| 4,896,943 | 1/1990 | Tolliver et al. ...................... 350/105 |
| 4,906,316 | 3/1990 | Seidl .................................... 156/234 |
| 4,919,994 | 4/1990 | Incremona et al. ................. 428/141 |
| 4,971,854 | 11/1990 | Hinishi et al. ....................... 428/195 |
| 5,004,649 | 4/1991 | Yamasaki et al. ................... 428/461 |

FOREIGN PATENT DOCUMENTS

| | | |
|---|---|---|
| 3422908C2 | 1/1986 | Germany . |
| 9110511.0 | 12/1991 | Germany . |
| 503851 | 4/1939 | United Kingdom . |
| 1568563 | 6/1980 | United Kingdom . |

*Primary Examiner*—Patrick J. Ryan
*Assistant Examiner*—William A. Krynski
*Attorney, Agent, or Firm*—Gary L. Griswold; Walter N. Kirn; Robert H. Jordan

[57] ABSTRACT

A hot stamping foil comprising in order a carrier, optional release control layer, color layer, and adherence layer, wherein the adherence layer comprises a mixture of ethylene copolymer dispersion and acrylic dispersion. Also a method using such foils to form graphic patterns on articles such as retroreflective license plates, stickers, or emblems and articles bearing graphic patterns formed using such foils.

19 Claims, 1 Drawing Sheet

HOT STAMPING FOIL

FIELD OF INVENTION

The present invention relates to a hot stamping foil, a method for using such foils to form desired graphic patterns on substrates, and articles made with such foils.

BACKGROUND

It is known to form graphic patterns on substrates using transfer articles bearing predesignated designs. G.B. Patent No. 1,218,058 (Hurst et al.) discloses transfers with an adhesive layer applied to only those areas intended to be transferred to the substrate. U.S. Pat. Nos. 4,7.86,537 (Sasaki) and 4,919,994 (Incremona et al.) disclose transfer graphic articles wherein the graphic design is formed via imagewise differential properties within the transfer film itself. One problem with such approaches is that a large and varied inventory must be maintained in order to provide a variety of graphic patterns.

Hot stamping foils comprising a carrier, one or more color layers, and an adherence layer have been known for some time. Such films have been used to provide imagewise graphic patterns, e.g., alphanumeric or decorative legends, to substrates. In some embodiments, additional members such as release layers are used to facilitate desired performance. In some embodiments, so-called "texture layers" and/or "ticks", metal layers, etc. are used as well to yield desired appearance. Hot stamping foils are also sometimes called hot stamp tapes or thermal transfer tapes.

To form a graphic pattern on a desired substrate, the adherence layer of the transfer film is contacted to the substrate and heat applied in imagewise fashion to the carrier. This leads to bonding of the adherence layer to the substrate where heat was applied. The carrier is then removed, resulting in selective separation of the color layer(s) therefrom in the region or regions corresponding to the image in which the heat was applied. The carrier and non-heated portions of the color layer(s) and adherence layer are removed from the substrate leaving the desired graphic pattern thereon. The color layer(s), adherence layer, and any other layers that are selectively applied to the substrate should split or fracture in desired manner in order for the applied graphic pattern to have a desired edge appearance.

Some illustrative examples of previously known hot stamping foils are disclosed in U.S. Pat. Nos. 3,770,479 (Dunning) 3,953,635 (Dunning), and 4,084,032 (Pasersky).

It has also been known to transfer graphic patterns using means in addition to or other than heat to achieve imagewise separation of imaging material from a carrier and adhesion to a substrate. For example, U.S. Pat. No. 3,834,925 (Matsumura et al.) discloses a transfer material that utilizes solvent action to achieve imagewise deposition.

An advantage of the foregoing techniques is that the transfer film may be made as a uniform sheet, i.e., with no specific latent image embodied therein. The applicator defines the graphic pattern by controlling the application process, e.g., imagewise application of heat. This permits the maintenance of a smaller inventory of material.

One well known use of hot stamping foils is to print legends on vehicle identification plates. For example, license plates produced using hot stamping foils have been used in Austria, Australia, Finland, Germany, Ireland, Portugal, and Switzerland. One commercially available hot stamping foil currently used on license plates with polyvinyl chloride cover films is believed to comprise a polyester carrier, about 28 microns thick; a color layer based on acrylic resins such as polymethyl methacrylate and containing carbon black pigments, about 5 microns thick; and an acrylate-based adherence layer, about 5 microns thick. Examples of resins that are believed to have been used in adherence layers include polyvinyl alcohol copolymers, nitrocellulose, and methyl methacrylate/butyl methacrylate copolymers.

Recently improved retroreflective sheetings have been made available which have cover films made of olefin-based materials or polyurethane-based materials to improve certain performance. As disclosed in U.S. Pat. No. 4,896,943 (Tolliver et al.), olefin-based cover films, e.g., ethylene/acrylic acid copolymers, can provide superior properties including abrasion and dirt resistance. Conventional hot stamping foils do not achieve good adherence to such cover sheets, however, resulting in graphic patterns having unsatisfactory durability and performance. The need exists for improved hot stamping foils which can be used to form durable graphic patterns on such cover sheets and a method for forming such graphic patterns.

SUMMARY OF INVENTION

The present invention provides a novel hot stamping foil that provides previously unattainable performance. The present invention also provides a novel method utilizing the hot stamping foils described herein to form graphic patterns on retroreflective substrates and also provide articles made with such transfer films.

Briefly summarizing, hot stamping foils of the invention comprise, in order, a carrier, optionally a release control layer, a color layer, and an adherence layer. In an important distinction over previously known hot stamping foils, the adherence layer of hot stamping foils of the invention comprises, and may consist essentially of, a mixture of an ethylene copolymer dispersion and an acrylic dispersion.

In brief summary, the method of the invention for forming a graphic pattern on a substrate comprises the steps of:
 a) providing a retroreflective sheet with a face on which a graphic pattern is to be formed;
 b) providing a hot stamping foil comprising, in order, a carrier, optionally a release control layer, a color layer, and an adherence layer wherein the adherence layer comprises a mixture of ethylene copolymer dispersion and acrylic dispersion;
 c) contacting the adherence layer to the face of the retroreflective sheeting such that carrier of the hot stamping foil is exposed;
 d) applying heat in imagewise fashion to the carrier of the hot stamping foil such that corresponding portions of the adherence layer are activated; and
 e) removing the carrier from the retroreflective sheet such that an imagewise portion of the adherence layer and the color layer remain bonded to the face of the retroreflective sheet and the remainder of the adherence layer and said color layer are removed with the carrier.

Hot stamping foils of the invention provide good adhesion to a variety of materials (such as polyvinyl chloride, polyurethanes, polyolefins, alkyd-melamines, etc.) that are used as cover films on retroreflective sheetings. One of the advantages of the present invention is that the hot stamping foils described herein can be used to form graphic patterns exhibiting good adhesion to high performance cover film materials such as olefin-based cover films, e.g., ethylene/acrylic acid copolymers. Graphics formed with foils of the invention do not need additional drying or curing time and achieve durable, abrasion-resistant state quickly. No special post application brushing or treatment is required. High resolution images with sharp edge definition may be achieved. The graphics are easily applied in solvent free manner and the foils are polyvinyl chloride, heavy metal free.

BRIEF DESCRIPTION OF DRAWING

The invention will be further explained with reference to the drawing, wherein.

These figures, which are idealized, are not to scale and are intended to be merely illustrative and non-limiting.

DETAILED DESCRIPTION OF ILLUSTRATIVE EMBODIMENTS

Figure 1:
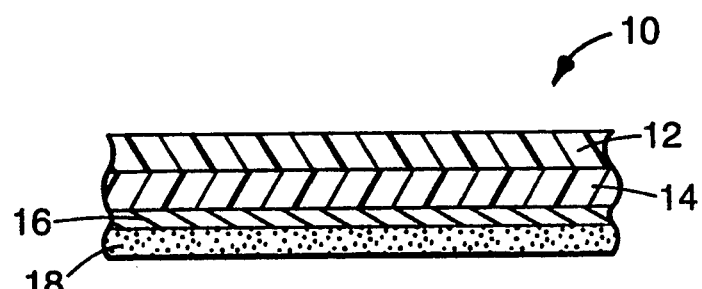
FIG. 1 is a cross-sectional illustration of an illustrative hot stamping foil of the invention.

An illustrative hot stamping foil of the invention is shown in FIG. 1. Hot stamping foil 10 comprises carrier 12, optional release control layer 14, color layer 16, and adherence layer 18. In some instances an optional release liner (not shown) may be provided over adherence layer 18.

Foils 10 of the invention are typically wound into roll form for shipping and handling and are typically sufficiently flexible to be wound around a 2.5 centimeter (1 inch) diameter core without cracking or breaking. In many instances, foils of the invention will be used to apply graphics to substantially planer surfaces, but if appropriate application equipment is used they can also be used to apply graphics to nonplanar substrates.

Carrier 12 provides means for handling foil 10. Carrier 12 is preferably sufficiently heat resistant to remain dimensionally stable (i.e., substantially without shrinking, curling, or stretching) when heated to a sufficiently high temperature to achieve adherence of the adherence layer to the desired substrate, e.g., typically at least about 200° C. in most instances. Also, carrier 12 preferably provides desired adhesion to the color layer during shipping and handling as well as desired release properties from the color layer after contact to the substrate and heating. Finally, carrier 12 and the other components of foil 10 preferably exhibit sufficient thermal conductivity such that heat applied in imagewise fashion will heat a suitable region of the adherence layer such that a graphic of desired resolution is transferred.

Carrier 12 is typically between about 10 and 40 microns thick. Carriers which are too thin may tend to provide insufficient support to foil 10 and carriers which are too thick may tend to provide insufficient thermal conductivity such that resolution of the graphic is impaired.

Suitable carriers 12 can be selected by those skilled in the art. Illustrative examples of suitable carrier materials include the following: polyester film (e.g., a sheet of MYLAR TM 23A Polyester from E. I. DuPont De Nemours Company), aluminum foil, and coated papers. The carrier should be able to withstand the temperature encountered during application, for instance, MYLAR TM polyester films are useful for application temperatures under 200° C. with other polyester films being preferred for use under higher temperatures.

Depending upon the characteristics of carrier 12 and color layer 16, optional intermediate release control layer 14 may be desired. Release control layer 14 may be selected to provide the desired adhesion and release characteristics between carrier 12 and color layer 16. Suitable release control layers may be readily selected by those skilled in the art. Illustrative examples of typically suitable materials include wax or lacquer. Typically, release control layers will be relatively thin, e.g., about 0.1 micron or so.

Color layer 16 is selected to provide desired adhesion and release from carrier 12, or, if used, release control layer 14. Color layer 16 also essentially defines the appearance of the resultant graphic and is formulated to provide the desired color. Color layer 16 may be made up of an essentially homogenous or uniform layer of desired color, or may be segmented with two or more different colors if desired. Color layer 16 and adherence layer 18 are typically coextensive with one another. They may each be substantially continuous over substantially the entire foil or they may be made up of discontinuous segments corresponding to the desired graphic pattern.

Typically color layer 16 comprises one or more inks selected from among the following: cellulose inks, polyvinyl chloride inks, polyurethane inks, and acrylic inks. Suitable color layers may be readily formulated by those skilled in the art.

Typically color layer 16 is between about 2 and about 15 microns thick, preferably between about 4 and about 6 microns thick. Color layers which are too thick may tend to undesirably increase the thermal conductivity of foil 10 such that graphic resolution is impaired. Color layers which are too thin may tend to yield graphics which do not exhibit desired durability, hiding power, etc. Color layer 16 can be formed by known techniques, e.g., coating or printing.

As will be understood, the surface texture and appearance of color layer 16 is defined at least in part by the surface of carrier 12, or release control layer 14 if used, to which it is contacted.

A critical feature of the present invention is the use of a novel adherence layer that provides surprising results. In accordance with the invention, adherence layer 18 comprises a mixture of ethylene copolymer dispersion and acrylic dispersion, as well as certain optional ingredients, if desired.

Advantageously the ethylene copolymers used herein display hot melt adhesive properties. The utility of such materials in this regard is influenced by their melt index and the binder copolymer is preferably selected so as to provide good quality hot melt adhesive characteristics. Generally, copolymers having a melt index (measured according to ASTM 1238-88) between about 50 and 2000 will be preferred, with those having a melt index between about 50 and 1500 being more preferred for use as binders herein. If the melt index is too high, the resulting polymer may tend to be too soft, have reduced temperature resistance, and be subject to undesirable creep. If the melt index of the selected copolymer is too high, the resultant adherence layer may be too stiff and may not form a good bond to substrates to which graphics are applied.

The most preferred binders are ethylene/acrylic acid copolymers and ethylene/methacrylic acid copolymers. In these materials the ethylene monomer preferably makes up about 91 to 97 mole percent of the copolymer with the acrylic or methacrylic acid monomer correspondingly providing about 3 to 9 mole percent.

Ethylene copolymer dispersions having a pH of at least 7 have been found to be generally stable and to yield a stable mixture with many acrylic dispersions used herein. It has been observed that using ethylene copolymer dispersions having a ph of less than 7 tend to lead to flocculation when mixed with some acrylic dispersions.

The viscosity of the ethylene copolymer dispersion should be such as to yield a mixture with the acrylic dispersion that can be formed into the adherence layer in desirable manner. For instance, if the adherence layer is to be formed via gravure printing, the viscosity of the ethylene copolymer dispersion should generally be below about 500 milli Pascals×seconds (mPa's). If the adherence layer is to be formed via rotary screen printing or coating, higher viscosities, e.g., up to about 5,000 mPa's are generally useful.

An example of a commercially available suitable ethylene copolymer is Dow Chemical Company's PRIMACOR TM 4990, a 35 weight percent solids water-based dispersion of ethylene/acrylic acid copolymer. Other illustrative alternative water-based ethylene/acrylic acid copolymer dispersions include ADCOTE TM 50T4983 (made from Dow PRIMACOR TM 5980) having approximately 20 weight percent (9 mole percent) acrylic acid and a melt index of 300, ADCOTE TM 50T4990 (made from Dow PRIMACOR TM 5990) having approximately 20 weight percent (9 mole percent) acrylic acid and a melt index of 1300, and ADCOTE TM 56220 having 13 weight percent (7.5 mole percent) methacrylic acid and a melt index of 60. Each of these materials is available from Morton. Other useful examples include MICA G−927 and Byk Cera's AQUACER TM 6RC684.

The ethylene copolymer is blended or supplemented with another resin to improve adhesive characteristics of the adherence layer. Particularly useful in this regard are acrylic emulsions resulting from the radical polymerization of methacrylic acid, acrylic acid, butyl acrylate, and/or other acrylic monomers.

Acrylic dispersions having a pH of at least 7 and a Brookfield viscosity of less than 200 mPa's have been found useful. It is believed that acrylic dispersions that yield films capable of being heat laminated to polyvinyl chloride or non-crosslinked polyurethanes at temperatures of under about 120° C. will be useful herein. An example of a commercially available suitable acrylic dispersion is ICI's NEOCRYL TM A45, a 37.5 weight percent solids water-based dispersion of acrylic copolymers. Also useful are polyurethane dispersions, resulting from the reaction of an aliphatic isocyanate with a polyol. An example of a commercially available suitable polyurethane dispersion is ICI's NEOREZ TM R962.

Commercially available waterborne polymer emulsions and dispersions are typically provided as a salt in which the carboxylic acid functionality has been neutralized with a base so as to improve the aqueous dispersibility of the resin. Consequently, it will be understood the adherence layer formulations may contain basic salts of the above polymers. Useful bases for neutralizing the carboxylic acid functionality include ammonia and other amines. Nonvolatile bases such as sodium hydroxide or potassium hydroxide may also be used, but are less preferred due to concerns of moisture sensitivity.

Ethylene copolymer dispersions and acrylic dispersions that yield mixtures that are of suitable viscosity for formation of an adherence layer via desired technique, stable mixtures, and soften at an appropriate temperature for hot stamping (e.g., typically at least 55° C. or more to withstand exposure in the application equipment and conditions to which the finished substrate is likely to be subjected and preferably within the range of about 100° to 120° C.) are suitable.

Typically the ethylene copolymer dispersion and acrylic dispersion are present in adherence layer 18 in a weight ratio between about 10:90 and about 60:40, preferably in a weight ratio between about 3:2 and about 2:3, and most preferably in a weight ratio between about 55:45 and about 45:55. Formulations outside these ranges tend to provide less effective results. For instance, it has been observed that adherence layers comprising essentially NEOCRYL TM A45 alone would provide satisfactory adherence to polyvinyl chloride cover films but not to other cover films such as polyolefins such as ethylene/acrylic acid copolymers (e.g., SURLYN TM and PRIMACOR TM materials), crosslinked polyurethanes, and polyurethane/acrylic blends. Also, its has been observed that adherence layers comprising essentially PRIMACOR TM 4990 alone do not provide satisfactory adherence to any of the following cover films: polyvinyl chloride, polyolefins such as ethylene/acrylic acid copolymers (e.g., SURLYN TM and PRIMACOR TM materials), crosslinked polyurethanes, and polyurethane/acrylic blends; and it is expected that such adherence layers would not provide satisfactory adherence to cover films of alkyd-melamine/polyester blends or polyvinylbutyral.

Formulations comprising between about 20 and about 30 parts by weight of PRIMACOR TM 4990, between about 30 and about 20 parts by weight of NEOCRYL TM A45, about 25 parts water, and about 25 parts ethanol, have been found to yield adherence layers that provided good adhesion to retroreflective sheetings with cover films made of polyvinyl chloride, polyolefins such as ethylene/acrylic acid copolymers (e.g., SURLYN TM and PRIMACOR TM materials), crosslinked polyurethanes, polyurethane/acrylic blends, alkyd-melamine/polyester blends, and polyvinylbutyral. Dilution with water and ethanol has been found to improve mixing of the two components to yield a uniform mixture and facilitates processing to form the adherence layer. A formulation containing equal parts by weight of PRIMACOR TM 4990, NEOCRYL TM A45, water, and ethanol has been found to be suitable for most applications.

Optimum mixing ratios for specific applications can be readily determined by trial and error. For instance, weight ratios of PRIMACOR TM 4990 to NEOCRYL TM A45 from about 2:3 to 1:9 have yield adherence layers that provided satisfactory adhesion to polyvinyl chloride and polyolefin cover films, but provided satisfactory adhesion to only some polyurethane-based cover films.

In some instances it may be desirable to include a water-based dispersion of polyurethane, e.g., up to about 20 to 35 parts of ICI's NEOREZ TM R962, in the adherence layer to improve adhesion to cover films made of polyvinyl chloride, polyolefins, and at least some polyurethanes.

Adherence layer 18 is typically between about 1 and about 5 microns thick, preferably between about 1 and about 3 microns thick. If adherence layer 18 is too thick, it may tend to yield a resultant graphic which has an undesirably high profile and it may also tend to reduce the thermal conductivity of foil 10 such that the resolution of the resultant graphic is less than desired. If adherence layer 18 is too thin, color layer 16 may not be securely bonded to the substrate (not shown) and thus may exhibit less durability than desired. Adherence layer 18 can be formed by known techniques, e.g., coating or printing.

Hot stamping foil 10 of the invention may be used to form a graphic pattern on the face of a retroreflective sheeting by the steps of:
a) providing a retroreflective sheet;
b) providing a hot stamping foil as described herein;
c) contacting the adherence layer of the hot stamping foil to the face of the retroreflective sheeting such that carrier of the hot stamping foil is exposed;
d) applying heat in imagewise fashion to the carrier such that corresponding portions of the adherence layer are activated; and
e) removing the carrier from the retroreflective sheet such that an imagewise portion of the adherence layer and the color layer remain bonded to the face of the retroreflective sheet and the remainder of the adherence layer and the color layer are removed with the carrier.

An advantage of the present invention is that hot stamping foils of the invention may be used to form graphic patterns on retroreflective sheetings and other substrates with face comprising olefin-based materials or polyurethane-based coatings. Conventional hot stamping foils do not adhere well to such substrates, particularly when no priming treatment is used. For instance, hot stamping foils of the invention may be used to great advantage to provide graphic patterns on cover films or faces that comprise ethylene/acrylic acid copolymer. If desired, hot stamping foils of the invention may be used to provide graphic patterns on substrates to which no priming treatment has been applied.

Figure 2:
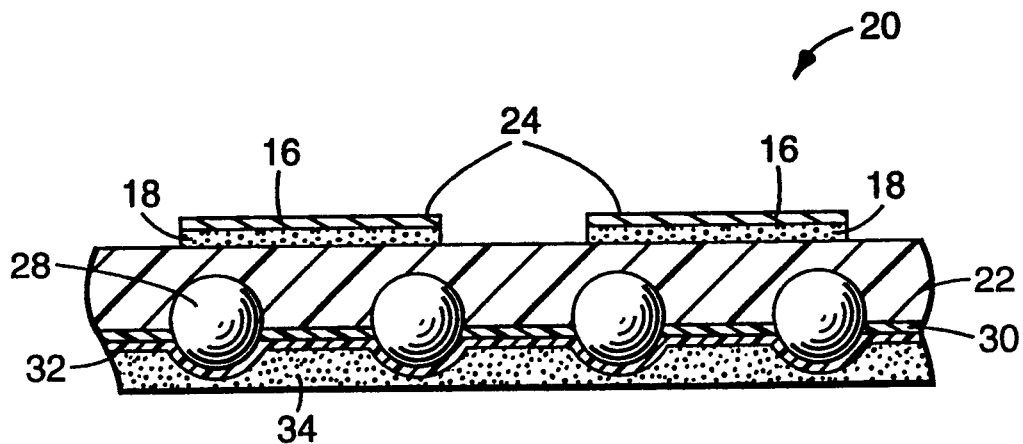
FIG. 2 is a cross-sectional illustration of an illustrative retroreflective article of the invention.

A typical article produced in accordance with the method of the invention using hot stamping foils of the invention is shown in FIG. 2. Retroreflective article 20 comprising face layer 22 made of an olefin-based material or a polyurethane-based coating with graphic pattern 24 adhered to face layer 22. Graphic pattern 24 comprises color layer 16 and adherence layer 18 as described herein. Typically retroreflective article 20 will comprise a layer of retroreflective elements (e.g., a monolayer of microspheres 28, spacing layer 30, and reflective layer 32) disposed under face layer 22 and adhesive layer 34. Illustrative examples of such articles include motor vehicle license plates, retroreflective stickers, or retroreflective emblems.

Various modifications and alterations of this invention will become apparent to those skilled in the art without departing from the scope and spirit of this invention.

What is claimed is:

1. A hot stamping foil comprising, in order, a carrier, a color layer, and an adherence layer, said adherence layer being between about 1 and about 5 microns thick and comprising a mixture of ethylene copolymer dispersion and acrylic dispersion in a weight ratio between about 10:90 and about 60:40, said ethylene copolymer dispersion comprising at least one of ethylene/acrylic acid copolymer or ethylene/methacrylic acid copolymer.

2. The foil of claim 1 wherein said ethylene copolymer dispersion has a Brookfield viscosity of less than 5000 milli Pascals×seconds.

3. The foil of claim 1 wherein said ethylene copolymer dispersion has a Brookfield viscosity of less than 500 milli Pascals×seconds.

4. The foil of claim 1 wherein said acrylic dispersion comprises the radical polymerization reaction product of at least one of methacrylic acid, acrylic acid, or butyl acrylate.

5. The foil of claim 1 wherein said acrylic dispersion has a Brookfield viscosity of less than about 200 milli Pascals×seconds.

6. The foil of claim 1 wherein said ethylene copolymer dispersion and acrylic dispersion are present in said adherence layer in a weight ratio between about 3:2 and about 2:3.

7. The foil of claim 1 wherein said ethylene copolymer dispersion and acrylic dispersion are present in said adherence layer in a weight ratio between about 5:45 and about 45:55.

8. The foil of claim 1 wherein said adherence layer is between about 1 and about 3 microns thick.

9. The foil of claim 1 further comprising a release control layer between said carrier and said color layer.

10. The foil of claim 9 wherein said release control layer comprises wax or lacquer.

11. The foil of claim 1 wherein said color layer comprises segments of two or more different colors.

12. The foil of claim 1 wherein said color layer comprises one or more inks selected from among the following: cellulose inks, polyvinyl chloride inks, polyurethane inks, and acrylic inks.

13. The foil of claim 1 wherein said color layer is between about 2 and about 15 microns thick.

14. The foil of claim 1 wherein said color layer is between about 4 and about 6 microns thick.

15. The foil of claim 1 wherein said carrier is selected from among the following: polyester film, aluminum foil, and coated papers.

16. The foil of claim 1 wherein said carrier is between about 10 and 40 microns.

17. The foil of claim 1 wherein said ethylene copolymer dispersion is water-based.

18. The foil of claim 1 wherein said acrylic dispersion is water-based.

19. The foil of claim 1 wherein said adherence layer further comprises a water-based dispersion of polyurethane.

* * * * *

UNITED STATES PATENT AND TRADEMARK OFFICE
CERTIFICATE OF CORRECTION

PATENT NO. : 5,393,590
DATED : February 28, 1995
INVENTOR(S) : Ruediger Caspari

It is certified that error appears in the above-indentified patent and that said Letters Patent is hereby corrected as shown below:

In Column 1, Line 15, the number "4,7.86,537" should read -- 4,786,537 --.

In Column 4, Line 68, the first word "high" should read -- low --.

In Column 6, Line 60, the word "yield" should read -- yielded --.

In Column 8, Line 32, the ratio "5:45" should read -- 55:45 --.

Signed and Sealed this

Nineteenth Day of September, 1995

Attest:

BRUCE LEHMAN

Attesting Officer

Commissioner of Patents and Trademarks